Oct. 24, 1939.  E. HANSON  2,177,252
WHEEL BALANCE TESTING MACHINE
Filed Dec. 28, 1936  5 Sheets-Sheet 1
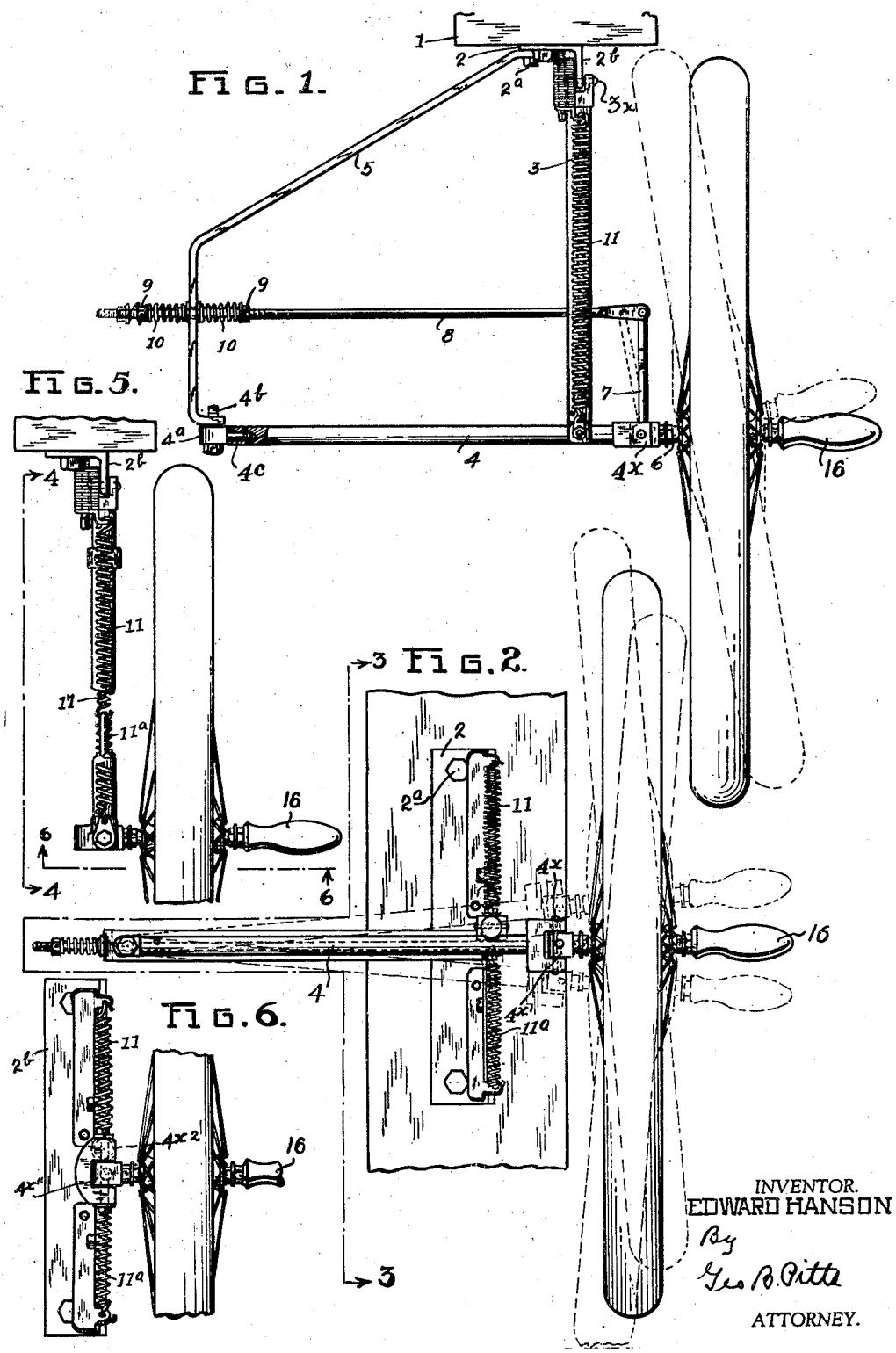
INVENTOR.
EDWARD HANSON
By
Geo. B. Pitts
ATTORNEY.

Oct. 24, 1939.  E. HANSON  2,177,252

WHEEL BALANCE TESTING MACHINE

Filed Dec. 28, 1936  5 Sheets-Sheet 2

INVENTOR.
EDWARD HANSON.
BY Geo. B. Pitts
ATTORNEY.

Oct. 24, 1939. E. HANSON 2,177,252
WHEEL BALANCE TESTING MACHINE
Filed Dec. 28, 1936 5 Sheets-Sheet 3
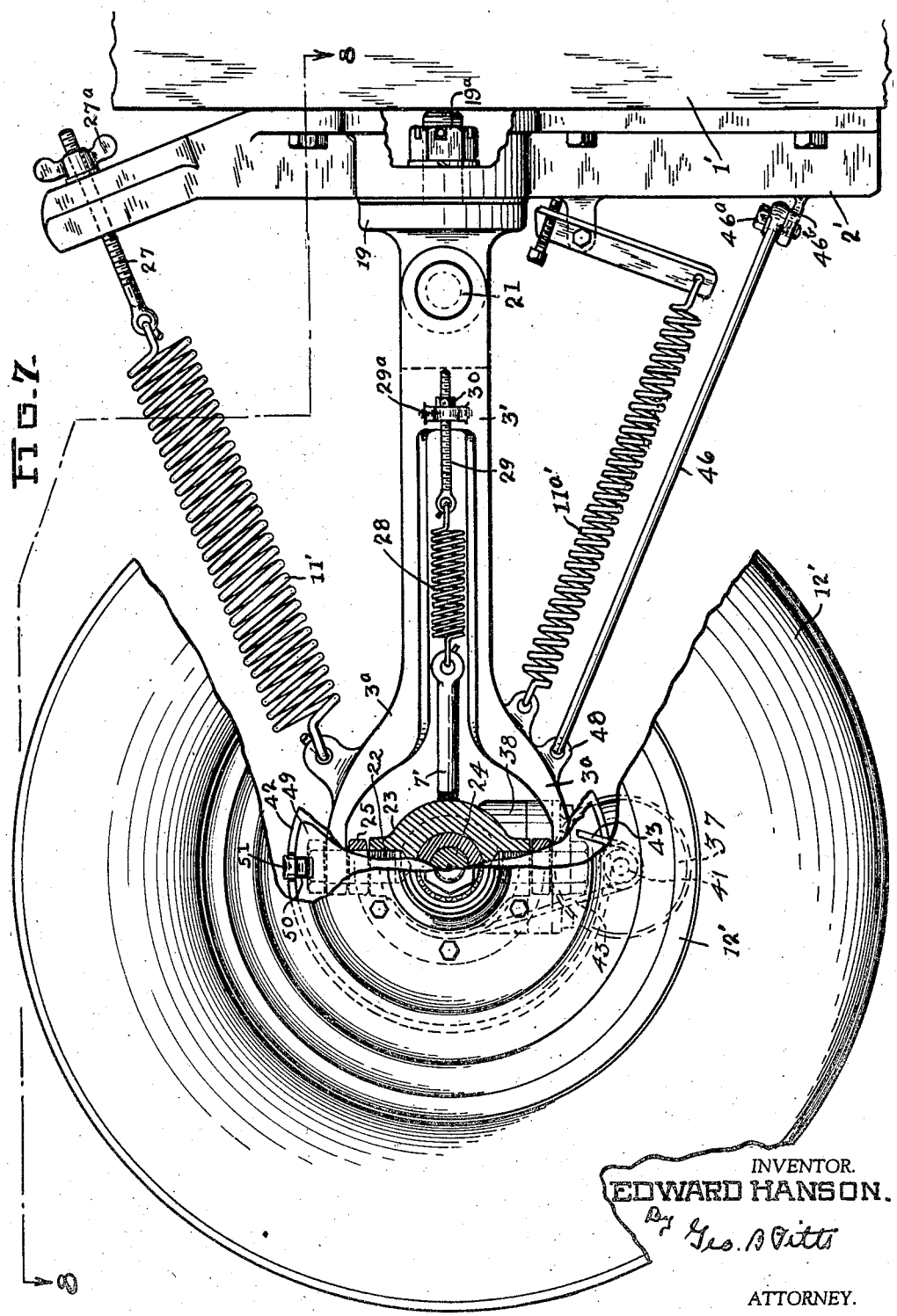
INVENTOR.
EDWARD HANSON.
By Geo. B Pitts
ATTORNEY.

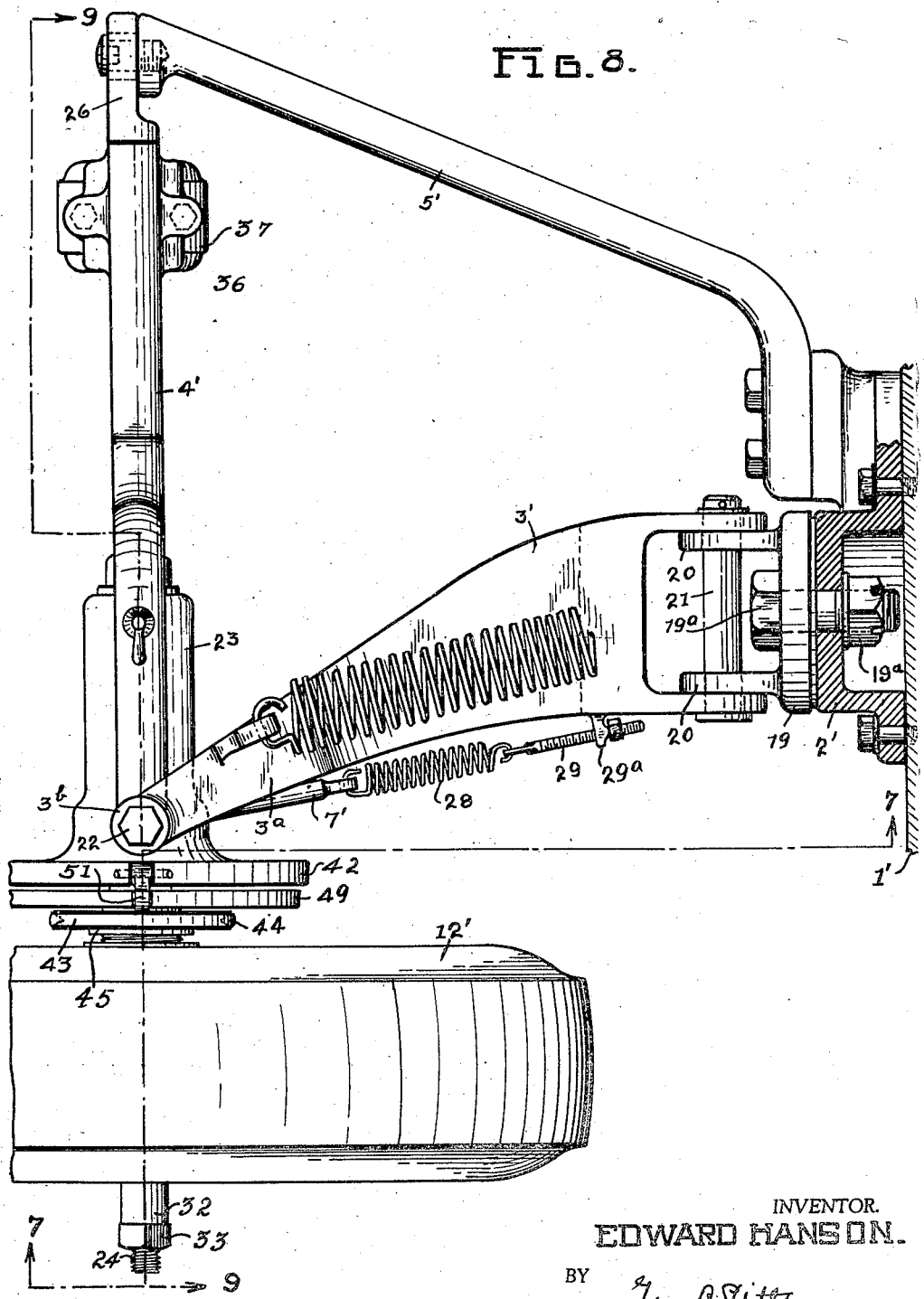

Oct. 24, 1939.  E. HANSON  2,177,252
WHEEL BALANCE TESTING MACHINE
Filed Dec. 28, 1936  5 Sheets-Sheet 5
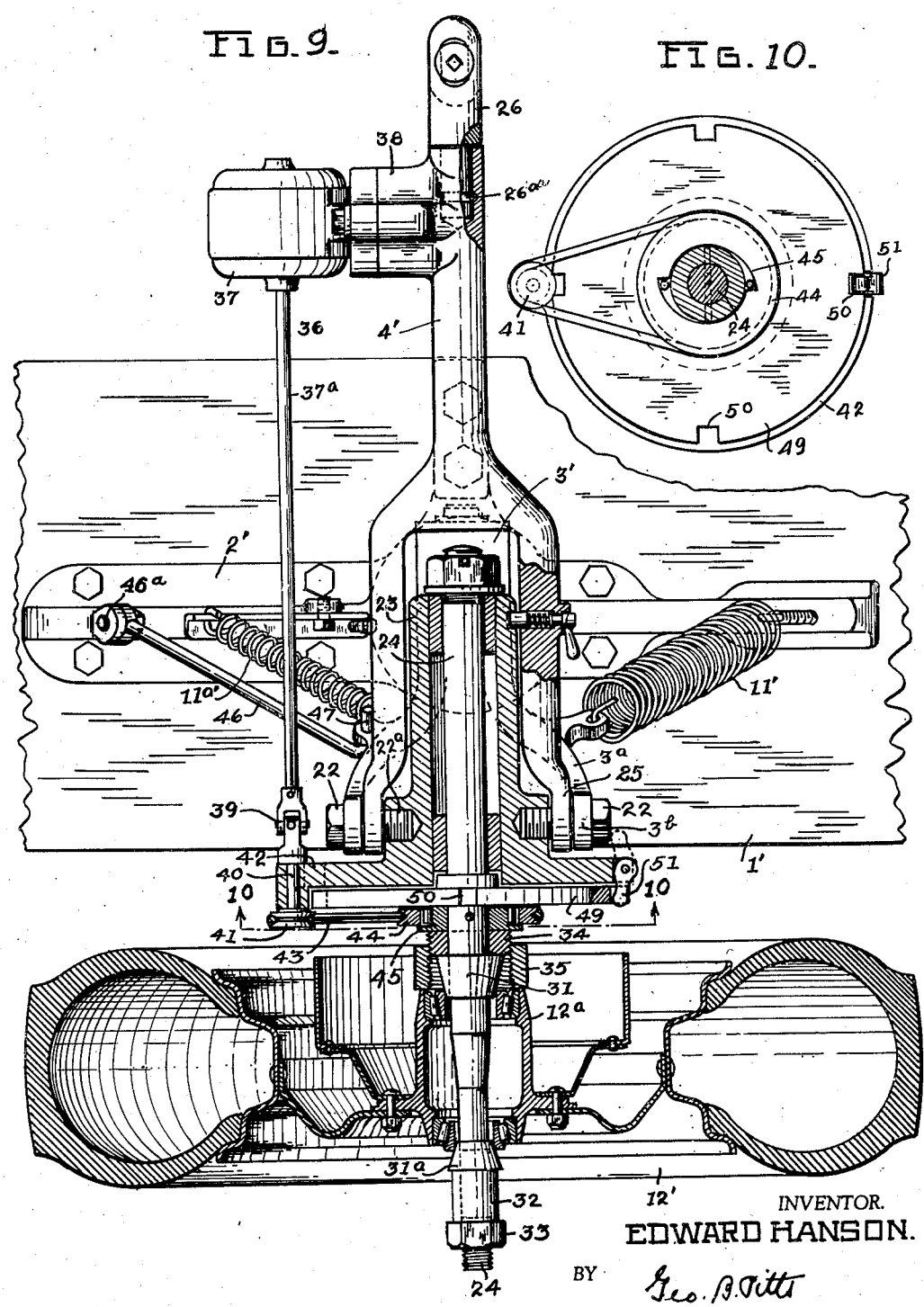
INVENTOR.
EDWARD HANSON.
BY Geo. B. Titts
ATTORNEY.

Patented Oct. 24, 1939

2,177,252

UNITED STATES PATENT OFFICE 2,177,252

WHEEL BALANCE TESTING MACHINE

Edward Hanson, Cleveland, Ohio, assignor to David A. Davies, Cleveland, Ohio

Application December 28, 1936, Serial No. 117,957

12 Claims. (Cl. 73—51)

This invention relates to a machine for testing bodies that are round or of annular shape to determine whether all portions thereof are uniformly balanced, more particularly bodies which in use are driven at relatively high speeds. For illustrative purposes one embodiment of the invention herein shown is adapted for demonstrating the running or rotatable characteristics of a wheel when balanced and unbalanced; and another embodiment herein shown is adapted to removably support a vehicle wheel, whereby the wheel may be operated to determine whether it is uniformly balanced, the latter embodiment also being adapted for use in removing and replacing tires on vehicle wheels. In the latter illustrated embodiment and a modification thereof I have shown an automobile wheel since I have, by preference, adapted the invention to such application; however the illustrations of a wheel and the use of the term "wheel" herein are for purposes of description and are not intended as limitations of the invention, as the latter may be adapted to rotatable bodies used for other purposes.

One object of the invention is to provide an improved machine which may be used to demonstrate the running or rotating characteristics of a body when in balanced and unbalanced condition and/or used to determine whether such a body is balanced or unbalanced.

Another object of the invention is to provide an improved machine having a movably mounted wheel support capable of responding to any vibrations of the wheel when rotated due to centrifugal forces resulting from any unbalanced portion of the wheel.

Another object of the invention is to provide an improved machine having a wheel support movably mounted to respond to vibrations set up in a wheel in its plane or laterally thereof, either or both, when the wheel is rotated on its support, due to an unbalanced condition of the wheel.

A further object of the invention is to provide an improved machine capable of demonstrating and/or testing the running characteristics of wheels and also capable of supporting a wheel while a tire is being removed from or positioned on its rim.

Other objects of the invention will be apparent to those skilled in the art to which my invention relates from the following description taken in connection with the accompanying drawings, wherein Fig. 1 is a plan view of a machine embodying my invention and having a wheel removably mounted thereon; in this embodiment of the invention the removable wheel is intended to be used for demonstration purposes.

Fig. 2 is a front elevation

Fig. 5 is a plan view substantially on the line 5—5 of Fig. 4

Fig. 6 is a front elevation substantially on the line 6—6 of Fig. 5.

Fig. 7 is a view partly in elevation and partly in section on the line 7—7 of Fig. 8, showing a different embodiment of the invention.

Fig. 8 is a view on the line 8—8 of Fig. 7.

Fig. 9 is a section on the line 9—9 of Fig. 8.

Fig. 10 is a section on the line 10—10 of Fig. 9.

Figure 3:
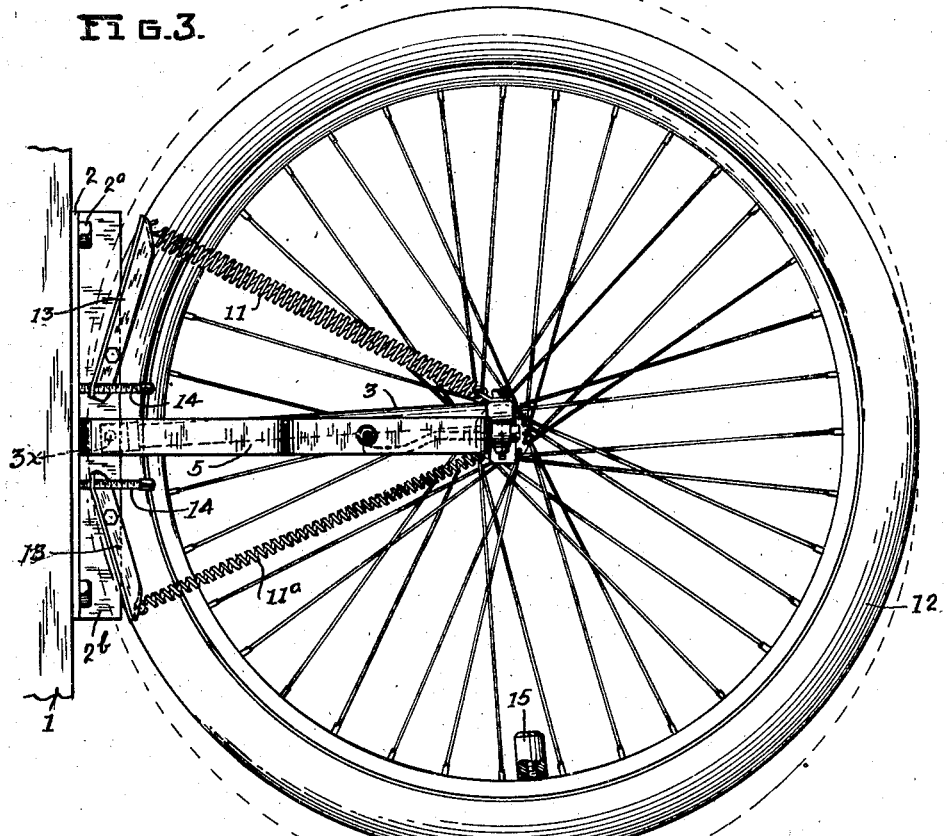
Fig. 3 is a side elevation

In the drawings, referring particularly to Figs. 1, 2 and 3, 1 indicates a suitable support which may be a portion of a standard or a portion of a wall structure. 2 indicates a base member fixed to the support by bolts 2a, the base member preferably being angle shaped so that one side wall may be bolted to the support 1 and its other side wall 2b may have connected to it the parts or elements of the machine to be referred to. The machine is constructed to removably support a wheel in such manner that any unbalanced condition in the wheel, circumferentially of its axis, is responded to by the elements of the machine and permits the wheel when rotated to vibrate in its plane or laterally thereof, in either or both directions, under the influence of this unbalanced condition. Accordingly, the elements cooperate to yieldably support the spindle for the wheel in a predetermined position, so that if the wheel is in a balanced condition, the wheel when rotated, will remain in such position, but permit the wheel to vibrate in a direction at right angles to the wheel axis and about a pivot at right angles to the wheel axis; the pivot being preferably arranged at one side of the wheel to approximate the mounting of a steerable wheel for a vehicle and to thereby make demonstrations under like conditions. The elements of the machine comprise the following: 3 indicates a connector pivoted at its inner end at 3x to the side wall 2b and pivotally connected at its outer end to the inner end of a spindle supporting member 4. 5 indicates a bracket fixed at its inner end to the side wall 2b and connected by a universal joint 4a to the outer end of the spindle supporting member 4.

The joint 4a may consist of an annular device connected by a pin 4b loosely extending through the device 4a, at right angles to the member 4, and threaded into the adjacent end of the bracket 5 and a pin 4c fixed to the side of the device 4a and fitting into a longitudinally extending opening formed in the outer end of the member 4, the free end of the pin 4c being loosely threaded to the walls of the opening to form a connection between these parts and permit a relative rotary movement between them incident to the vibratory motions set up, as already set forth. The inner ends of the spindle supporting member 4 and wheel spindle 6 are provided with suitable knuckles 4x, 4x', to swingably support the wheel, and the knuckle for the wheel spindle 6 has fixed to it an arm 7, which in this form of construction is connected at its outer end to the inner end of a link or thrust element 8. The link or thrust element 8 extends through and slidably and pivotally fits an opening formed in the bracket 5 and is provided at opposite sides of the bracket 5 but in spaced relation thereto with abutments 9 between each of which and the bracket is a coiled spring 10. The abutments 9 preferably comprise nuts threaded on the link to permit of adjustment therealong to increase or decrease the tension of the springs 10. The springs 10 normally exert an equal tension on the abutments and hence co-act therethrough, the link 8 and arm 7 to normally maintain the wheel spindle 6 axially of its supporting member 4, but permit movement of the spindle about the axis of its knuckle 4x' in either direction. 11, 11a, indicate a pair of springs operatively connected at their outer ends to the connector 3, but due to the fact that in this form of construction the outer end of the connector 3 is attached to the top wall of the member 4, the outer end of the spring 11a is connected to the latter. But as will be noted, the springs 11, 11a, are disposed, by preference, in the plane of movement of the connector and normally co-act in opposed relation to maintain the latter in a predetermined position but permit swinging movements of the connector 3 in either direction about the pivot 3x therefor at its inner end. In the arrangement shown the inner ends of the springs 11, 11a, are adjustably connected to the side wall 2b above and below the connector 3.

In the construction illustrated the machine is arranged to be mounted on a support and extend laterally therefrom, thereby leaving the space below the wheel and machine unobstructed, the upper spring 11 being somewhat stronger than the lower spring 11a to compensate for the weight of the connector 3, member 4, wheel spindle 6 and a wheel 12 on the latter and other parts of the machine. The adjustable connections for the inner ends of the springs 11, 11a, are similar in construction, each comprising a lever 13 fulcrumed intermediate its ends on the side wall 2b and having one end connected to the inner end of the adjacent spring. The opposite end of the lever 13 is formed with a threaded opening to adjustably receive and support a screw 14 which engages the adjacent side wall of the base member 2 and accordingly co-acts with the spring tension and lever fulcrum to support the lever in a fixed, adjusted position and connect the spring to the base member 2. With the elements assembled and arranged as described, the wheel 12 may be rotated and if any portion of the wheel is unbalanced it will vibrate as shown in dotted lines in Figs. 1, 2 and 3.

For demonstration purposes, I provide on the wheel 12 a removable weight 15 which may be slipped over the valve stem for the wheel tire or a pin 15a fixed to the wheel rim.

In the form of construction shown in Figs. 1, 2 and 3, the inner end of the wheel spindle 6 is threaded into an opening formed in the spindle knuckle 4x', to permit detachment of the spindle and carries at its outer end a handle 16, so that upon removal of the spindle, it and the wheel 12 may be conveniently held by the handle and the wheel manually rotated, first with the weight 15 removed to demonstrate that the wheel has no vibration and then with the weight attached to demonstrate the forces set up when an unbalanced condition exists.

Figure 4:
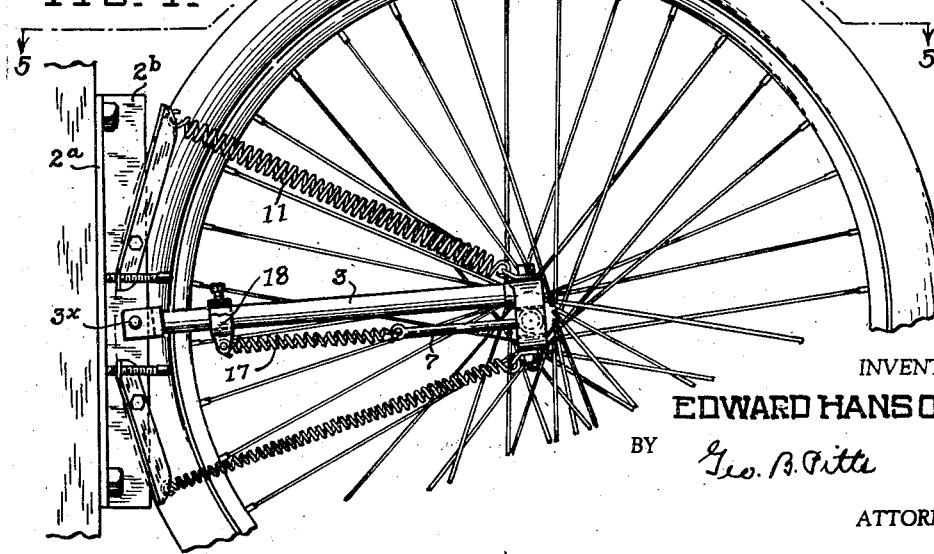
Fig. 4 is a side elevation showing a modified form of construction, substantially on the line 4—4 of Fig. 5.

Figs. 4, 5 and 6 illustrate a modified form of construction wherein the knuckle 4" for the removable wheel spindle 6 is mounted on knuckles $4x^2$ carried by the outer end of the connector 3 and the arm 7 connected to the spindle knuckle 4" is connected by a spring 17 to a collar 18 adjustably mounted on the connector 3, the spring 17 serving to normally maintain the wheel spindle in non-vibrating position but permitting it to swing in either direction about the axis of the knuckles.

Figs. 7, 8, 9 and 10 illustrate a different embodiment of the invention, capable of removably mounting a vehicle wheel, and provided with a driving means for the wheel spindle and locking means for holding the wheel in fixed positions, whereby a tire may be removed from or positioned on the wheel rim. This embodiment does not differ in its mode of operation to demonstrate the balanced or unbalanced condition and rotating characteristics of a wheel from the embodiments shown in Figs. 1 to 6, inclusive, but its elements are constructed to support and withstand the vibrations of a complete vehicle wheel of the type shown and any parts assembled thereon, as well as to withstand the forces necessary to remove from or position a tire on the wheel rim. In this embodiment, 2' indicates a base member preferably bolted to a suitable support 1'. 19 indicates a fitting secured to the base member 2' by a bolt 19a and provided with projecting lugs 20, in spaced relation for supporting a pin 21, which forms the pivot for the inner end of a connector 3'. The outer end of the connector 3' is bifurcated, as shown at 3a. The free ends of the bifurcations terminate in hollow bosses 3b through which loosely extend bolts 22, the inner ends of the bolts being screwed into threaded openings formed in a sleeve 23. The sleeve 23 is provided with suitable bearings for the inner end of a spindle or shaft 24 which extends outwardly beyond the sleeve, the outer end of the shaft being arranged to support a wheel, indicated as an entirety at 12', which is to be tested or to have its tire removed. 4' indicates a supporting member having a bifurcated outer end. The free ends of the bifurcations terminate in hollow bosses 25 through which the pins 22 loosely extend, the bosses 25 being disposed on the inner sides of the bosses 3b. The pins 22 serve to swingably support the sleeve 23 and parts carried thereby on the bifurcated ends of the connector 3' and supporting member 4'. The outer end of the supporting member 4' is connected by a universal joint 26 to the outer end of a bracket 5', the inner end of the latter being suitably bolted to the base member 2'. The joint 26 is similar in construction to the universal joint previously described, except that the pin which extends into the adjacent end of the supporting member 4' is held in connected relation thereto by a spring 26a (see Fig. 9). 11', 11a', indicate springs cooperatively related to normally maintain the connector 3' and inner end of the supporting member 4' and the shaft 24 (together with other parts associated therewith) in a predetermined position. The spring 11a' is adjustably connected to the base member 2' similarly to that described with respect to the springs 11, 11a, and the spring 11' may also, if desired be adjustably connected in the same manner, but is shown connected to a screw 27 extended through an integral extension of the base member 2' and adjustably engaged by a thumb nut 27a. As will be understood the spring 11' is stronger than the spring 11a'. The sleeve 23 is provided with an arm 7' to which one end of a spring 28 is connected. The opposite end of the spring is connected to a screw 29 which passes through an opening formed in a lug 29a projecting from the connector 3', the screw being provided with a nut 30 which engages the lug to secure the screw in adjusted position. The arm 7' may consist of an eyebolt threaded at its inner end into the sleeve 23. As will be understood the spring 28 serves to normally maintain the sleeve 23 and axle 24 in mid position but permits these parts to swing in either direction about the axis of the pins 22.

The wheel 12' is mounted on the shaft 24 between spaced cones 31, 31a, the latter being clamped against the outer wheel bearing by a spacer 32, engaged by a nut 33 which is threaded on the free end of the shaft. The inner cone 31 abuts against a collar 34 keyed or otherwise secured to the shaft. The collar 34 is externally threaded to mount a threaded ring nut 35, which may be rotated on the collar 34 and tightened against the hub 12a of the wheel 12' as shown in Fig. 9 and thus secure the wheel to the shaft.

Although the wheel may be rotated manually when mounted as shown, I prefer to provide power means, indicated as an entirety at 36, for rotating the shaft, whereby it may be speeded up and rotated at the approximate speeds of the wheel when in use. Of these power means, 37 indicates an electric motor suitably bolted to a pad 38 formed integrally on the lower side of the supporting member 4'. The shaft 37a of the motor 37 is extended forwardly and connected by a universal joint 39, the axis of which is in alinement with the axis of the pins 22, to a shaft 40 provided with a power element, such as a pulley 41. The shaft 40 is rotatably supported in the lateral portion of a disk 42 formed integrally with the outer end of the sleeve 23. The pulley 41 is engaged by an endless belt 43 which engages with and drives a pulley 44, which forms the outer element of an over-running clutch 45, the inner element of which is suitably fixed to the shaft 24.

The machine herein described may be used for rigidly supporting the wheel 12' while removing a tire therefrom or positioning a tire on the wheel, the machine being advantageous for these operations since the wheel is supported in vertical position and provision is made for holding the wheel against rotation in different angular positions. For carrying out these operations I provide a rod 46 which is pivoted at its inner end on a bolt 46a mounted in a lug 46b carried by the base member 2' and is provided at its outer end with a hook 47 arranged to removably engage an eye 48 provided on the connector 3', and when connected to the eye 48 as shown in Figs. 7 and 9, the connector 3' and supporting member 4' are held against movement. To prevent rotation of the shaft 24, I provide thereon a plate 49 formed on its periphery with one or more notches 50 into any one of which may be positioned a locking element 51 carried by the disk 42. The locking element 51 may consist of a detent pivoted on the disk 42 and adapted to be swung into the position shown in dotted lines in Fig. 9, to permit rotation of the shaft 24. I have shown four notches in the locking plate 49 (see Fig. 10), so that the wheel 12' may be rotated to and locked against rotation at four different angular positions.

To those skilled in the art to which my invention relates many changes in construction and widely differing embodiments and applications of the invention will be apparent without departing from the spirit and scope of the invention. My disclosures and the description herein are purely illustrative and are not intended to be in any sense limiting.

What I claim is:

1. In a machine of the class described, the combination of a support, a connector pivotally mounted thereon at one end, means on the outer end portion of said connector for supporting a spindle adapted to rotatably support a member, to swing about an axis at right angles to the axis of the spindle, springs engaging said connector and normally co-acting in opposed relation to yieldingly maintain said connector in a predetermined position, and spring means connected to said supporting means for yieldingly maintaining said spindle in a predetermined position.

2. In a machine of the class described, the combination of a support, a connector pivotally thereon at one end, a fitting pivotally mounted on the outer end of said connector, a spindle removably mounted on said fitting and adapted to rotatably support a member, springs engaging said connector and normally co-acting in opposed relation to yieldingly maintain said connector in a predetermined position, and spring means connected to said fitting for yieldingly maintaining it in a predetermined position.

3. In a machine of the class described, the combination of a support, a connector pivotally mounted thereon at one end, a supporting device pivotally mounted on the outer end portion of said connector, a spindle mounted at one end on said device and adapted to support a member, springs engaging said connector and normally co-acting in opposed relation to yieldingly maintain said connector in a predetermined position, and resilient means connected to said device for yieldingly maintaining it in a predetermined position.

4. A machine as claimed in claim 3 in which power means are provided for rotating said spindle.

5. A machine as claimed in claim 3 in which power means are provided for rotating said spindle, the power means being operatively connected to the spindle by an over-running clutch.

6. A machine as claimed in claim 3 in which means are provided for locking the connector against movement and for locking the spindle against rotation.

7. In a machine of the class described, the combination of a support, a connector pivotally mounted thereon at one end to swing in a predetermined plane, a device pivotally mounted on the outer end portion of said connector to swing in a plane at right angles to the plane of movement of said connector, a spindle mounted on said device and adapted to removably support a wheel, means for removably securing a wheel to said spindle, springs engaging said connector and normally co-acting in opposed relation to yieldingly maintain said connector in a position intermediate its limits of swinging movement, and resilient means connected to said device for yieldingly maintaining it in a predetermined position.

8. A machine as claimed in claim 7 in which means are provided for rotating said spindle.

9. In a machine of the class described, the combination of a support, a connector pivotally mounted thereon at one end, a bracket fixed to said support, a supporting member pivotally supported at its opposite ends on the outer end portion of said connector and said bracket, a spindle knuckle mounted at one end on the outer end of said member and adapted to rotatably support a wheel, springs engaging said connector and co-acting in opposed relation to normally maintain said connector in a predetermined position, said spindle having an arm, a thrust element connected at one end to said arm and movably mounted at its outer end portion on said bracket, and springs operatively connected to said element and said bracket and arranged to co-act in opposed relation to normally maintain said arm in a predetermined position.

10. In a machine of the class described, the combination of a support, a connector pivotally mounted thereon at one end, a device pivotally mounted on the outer end of said connector, a spindle removably connected at one end to said device and adapted to rotatably support a wheel, a handle on the opposite end of said spindle, resilient means normally tending to maintain said connector in a predetermined position but permit it to swing about its pivot in either direction, and resilient means operatively connected to said device and normally tending to maintain it in a predetermined position but permit said device to swing about its pivot in either direction.

11. In a machine of the class described, the combination of a support, a connector pivotally mounted thereon at one end, a supporting member pivotally connected to the opposite end of said connector and disposed at substantially right angles to the plane in which the connector swings, means on one end portion of said supporting member for swingably supporting a spindle on which a wheel may be mounted for rotation, a bracket on said support, a universal joint connection between said bracket and the opposite end portion of said supporting member, springs normally tending to maintain said connector in a predetermined position, and a spring operated mechanism normally tending to maintain that element of said spindle supporting means to which the spindle is connected axially of said supporting member.

12. In a machine of the class described, the combination of a support, a pair of elements extending therefrom, one of said elements being rigidly mounted on said support and the other element being pivoted to said support, a member pivotally connected at its opposite end portions to the outer ends of said elements, a knuckle mounted on that end of said member adjacent said pivoted element, said knuckle being adapted to support a spindle on which a wheel may be mounted for rotation, springs between said support and said pivoted element in opposed relation to yieldingly maintain said element in a predetermined position, an arm extending from said knuckle, a thrust element connected to said arm, and springs operatively connected to said thrust element and one of said first mentioned elements and arranged to co-act in opposed relation to normally maintain said arm in a predetermined position.

EDWARD HANSON.

UNITED STATES PATENT AND TRADEMARK OFFICE
CERTIFICATE OF CORRECTION

PATENT NO. : 5,177,252
DATED : January 5, 1993
INVENTOR(S) : John R. Williams

It is certified that error appears in the above-indentified patent and that said Letters Patent is hereby corrected as shown below:

Column 4, line 15, "T group" should read --The group--.

Column 4, line 30, "B" should read --$\beta$--.

Column 4, line 34, "R." should read --R'--.

Column 10, line 13, "919" should read --191--.

Column 10, line 60, "10989" should read --1089--.

Column 16, Table V, line 3, "$CF_2=CCL_2$" should read --$CF_2=CCl_2$--.

Column 26, line 13, "FIG. 1A" should read --FIG. 2--.

Column 26, line 52, " $(CF_2-CCl_2$" is changed to -- $(CF_2-CFBr)_2$ --

Column 27, line 35, "98" should read --98%--.

Column 28, line 67, "(22, $CF_3$);" should read --(22%, $CF_3$);--

Column 29, line 1, "(35," should read --35%,--.

Column 29, line 2, "(100, etc" should read --100%, etc--.

Column 29, line 28, "(47, $C_5H_2$);" should read --(47%, $C_5H_2$);--.

UNITED STATES PATENT AND TRADEMARK OFFICE
CERTIFICATE OF CORRECTION

PATENT NO. : 5,177,252
DATED : January 5, 1993
INVENTOR(S) : John R. Williams

It is certified that error appears in the above-indentified patent and that said Letters Patent is hereby corrected as shown below:

Column 29, line 29, "129 (22," should read --129 (22%,--.

Column 29, line 30, "131 (70, etc" should read --131 (70%, etc.--.

Column 29, line 62, "(100, etc" should read --(100%, etc.--.

Column 30, line 17, "Pure" should read --pure--.

Column 30, line 42, "(31, etc" should read --(31%, etc.--.

Column 30, line 43, "(100, etc" should read --(100%, etc.--.

Column 31, line 7, "disc" should read --disc.--.

Column 31, line 39, "10," should read --10%,--.

Column 32, line 21, "Pin" should read ---pin--.

Column 33, line 38, "niro" should read --nitro--.

Signed and Sealed this

Twenty-eighth Day of June, 1994

Attest:

BRUCE LEHMAN

*Attesting Officer*   *Commissioner of Patents and Trademarks*